United States Patent [19]

Lipman

[11] Patent Number: 5,218,725
[45] Date of Patent: Jun. 15, 1993

[54] FLUSH VALVE WATER ACCELERATOR

[76] Inventor: Wilfred E. Lipman, P.O. Box 246, Sullivan's Island, S.C. 29482

[21] Appl. No.: 881,648

[22] Filed: May 12, 1992

[51] Int. Cl.$^5$ .......................... E03D 1/00; E03D 1/34
[52] U.S. Cl. ........................................... 4/415; 4/392; 4/393; 4/378
[58] Field of Search ................... 4/415, 392, 393, 395, 4/403, 404, 324, 325, 326, 378, 400

[56] References Cited

U.S. PATENT DOCUMENTS

| | | | |
|---|---|---|---|
| 1,165,228 | 12/1915 | Coburn | 4/368 |
| 1,307,391 | 6/1919 | Bush | 4/378 |
| 1,573,688 | 2/1926 | Dumont | 4/393 |
| 1,577,728 | 3/1926 | Katzin | 4/403 |
| 1,887,295 | 11/1932 | Freed | 4/378 |
| 2,779,028 | 1/1957 | Branch | 4/393 |
| 2,797,418 | 7/1957 | Reed | 4/395 |
| 3,296,629 | 1/1967 | Clark | 4/333 |
| 3,839,747 | 10/1974 | Clark | 4/327 |
| 4,106,136 | 8/1978 | Lippincott, Sr. | 4/415 |
| 4,840,196 | 6/1989 | Antunez | 4/378 |
| 4,868,933 | 9/1989 | Chen | 4/415 |
| 4,910,813 | 3/1990 | Applegarth | 4/393 |
| 4,984,312 | 1/1991 | Pickerrell et al. | 4/415 |

OTHER PUBLICATIONS

Kohler Replacement Parts, pp. 105, 109, and 111 dated Aug. 1981, for K-9354, K-9364 Flush valves.

*Primary Examiner*—Henry J. Recla
*Assistant Examiner*—Charles R. Eloshway
*Attorney, Agent, or Firm*—B. Craig Killough

[57] ABSTRACT

A flush valve water accelerator having a top opening of increased height to reduce the amount of water used by a toilet, and which accelerates the flow of water to increase the efficacy of the water in the toilet bowl. The device is comprised of an entry tube and an exit tube, with the exit tube having a minimum inside diameter of approximately fifty (50) percent of the median inside diameter of the entry tube to accelerate the flow of water into the toilet bowl without causing cavitation from the vacuum created by the restriction of the exit tube. A connecting tube, having a decreasing inside diameter, connects the entry tube and the exit tube.

8 Claims, 2 Drawing Sheets

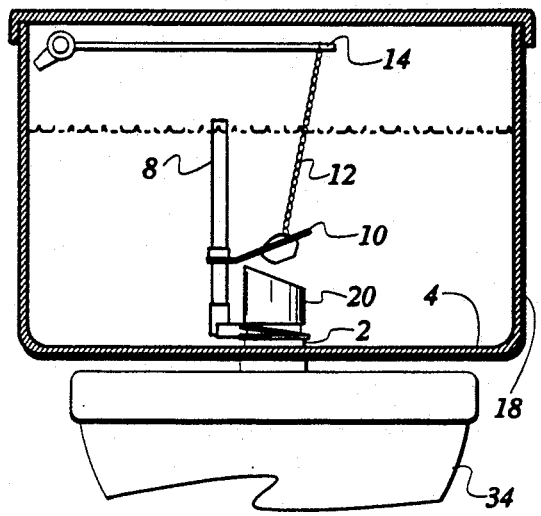
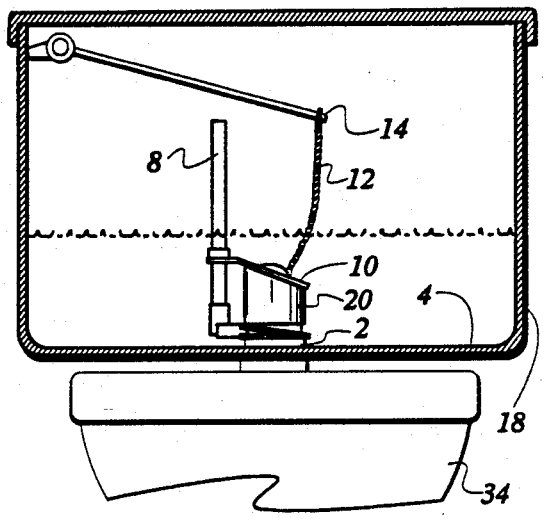
FIG 2    FIG 3
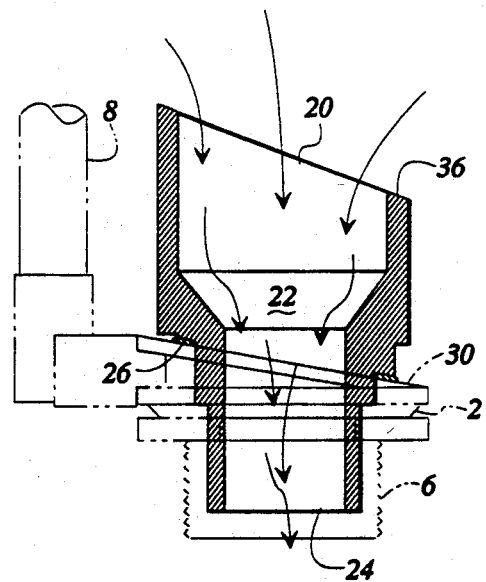
FIG 4

FLUSH VALVE WATER ACCELERATOR

BACKGROUND OF THE INVENTION

This invention relates generally to toilets and water closets, and is more specifically directed to a flush valve located within a water closet which reduces water consumption.

Fresh water is becoming an increasingly valuable natural resource. Many communities are frequently on water restriction, and this trend is predicted to continue.

Toilets in homes and business use a great amount of water A U.S. Environmental Protection Agency report dated Dec. 19, 1980, stated that approximately 40% of the water used in a home is flushed down the toilet. A need exists to reduce the amount of water which is used to flush toilets, while maintaining the effectiveness of the toilet in removing waste.

Various means and devices have been presented to reduce water consumption in the toilet. These means have included lowering the water level of the toilet, or placing foreign objects such as bricks in the tank of the toilet which effectively reduce the volume of water within the water closet of the toilet. These means, which will reduce the amount of water used, will not provide sufficient water to effectively remove waste products from the toilet.

Toilets as are used in most residential applications, and in many business applications, are characterized by a water closet which fills to a desired level. The filling of the water closet is controlled by a device known as a ball-cock, which allows a valve to control the flow of water into the water closet, so as to shut off the flow of water when the water level reaches a desired, predetermined level.

In the operation of a typical toilet, a flush valve is mounted to the floor of the water closet. This flush valve extends through an opening in the floor of the water closet, and is mounted to the water closet by threaded means 6 provided on the flush valve. An overflow tube 8 extends upwardly from the flush valve. A flap valve 10 is mounted on the overflow tube and is lifted by means of a chain 12 mounted to a lever 14 which can be actuated externally from the water closet, so as to open the valve and allow water to flow through the valve opening and out of the water closet and into the toilet bowl.

The flap valve 10 is designed so as to initially "float" as it is lifted away from the flush valve to allow sufficient water to flow from the water closet, even if the lever is released. This flotation is achieved by allowing air to enter the flap valve through void 76. The water closet is then refilled to the desired level by water refill means, which is typically a ballcock, and which is not shown in the drawings.

SUMMARY OF THE INVENTION

The present invention provides a flush valve which requires less water to flush a toilet than the flush valves in standard and common use, while effectively removing waste products from the toilet. The present invention provides a means which accelerates water as it enters the toilet bowl to increase the action and the velocity of the water, thereby maintaining or increasing the efficacy of the toilet, while using less water.

The present invention raises the level of the opening of the flush valve through which water from the water closet passes to enter the bowl so as to allow less than all of the water which is present in the water closet 18 to enter the valve, thereby decreasing the amount of water which is used for each flush. The device comprises an entry tube 20 which narrows to an exit tube 24 creating a restriction which accelerates the water and increases the water velocity as it exits the tube and enters the bowl 34 of the toilet, yielding an increased effectiveness of the water in cleaning the toilet bowl. The device creates an increased suction or vacuum through the entry tube 20, causing the flap valve 10 to be rapidly pulled against the top opening 36 of the tube. This action results in increased water savings, since the flap valve actually closes before it would by gravitational means, due to the suction, thereby releasing less water from the water closet, and achieving greater water savings.

DETAILED DESCRIPTION OF THE DRAWINGS

Figure 1:
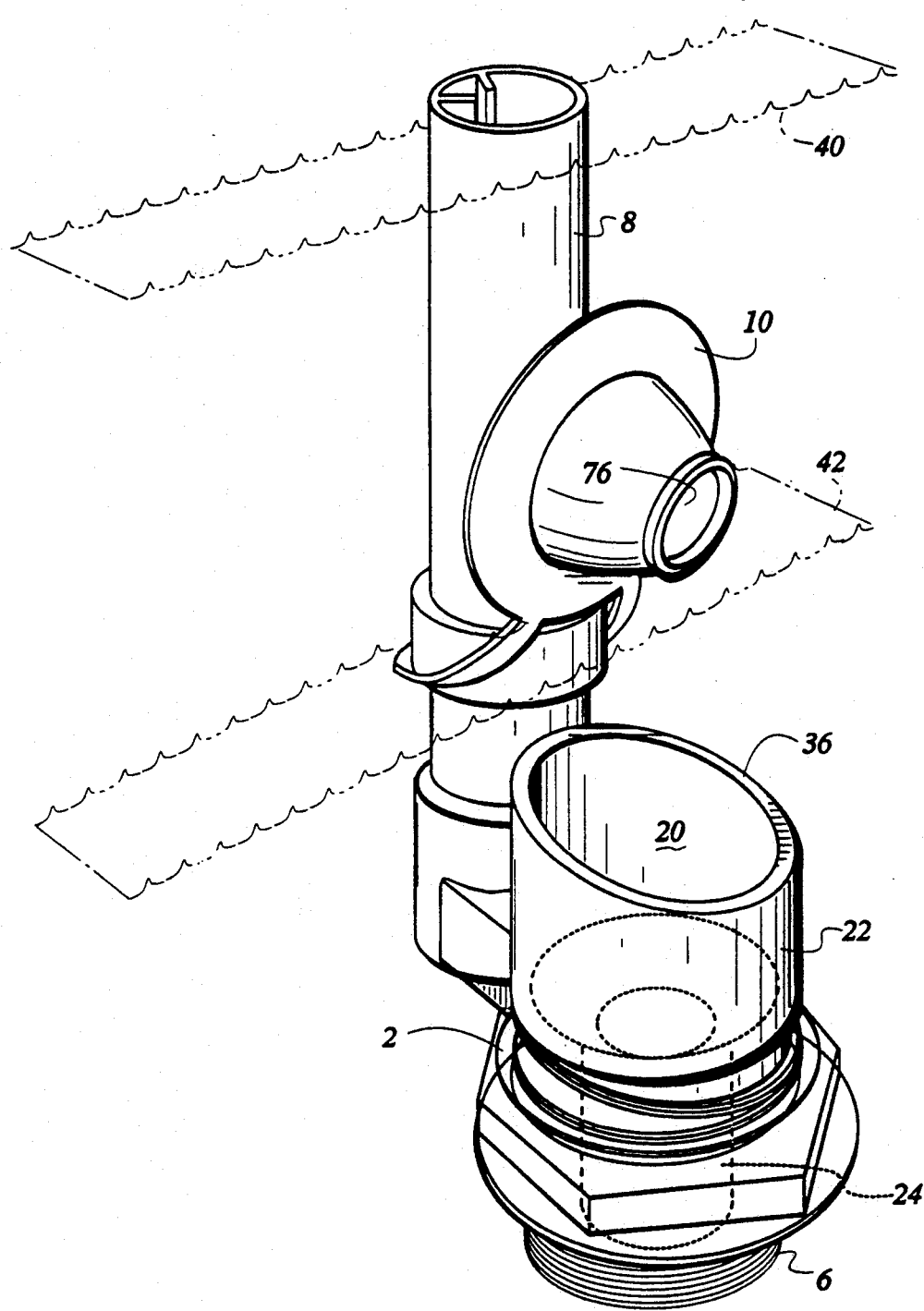

FIG. 1 is a perspective view of the device, mounted to a flush valve 2, and showing planes 40,42 to demonstrate the relative drop in the water level as water is emptied from the water closet into the toilet bowl through the flush valve.

FIG. 2 is a front elevation of a toilet with the water closet 18 sectioned to reveal the operation of the device which is mounted to the existing flush valve 2. The water level is shown as decreasing as water exits as a result of the open flap valve 10. The water inlet means of a typical toilet, such as a ballcock and valve, has been eliminated for the demonstration of these drawings only.

FIG. 3 is substantially the same as FIG. 4, excepting that the flap valve 10 is shown as closed, and the flow of water from the water closet through the device is terminated.

FIG. 4 is a side, sectioned view of the device with a partial view of a flush valve 2 shown as a phantom. The arrows indicate the water flow, and the acceleration of the water as it flows from the entry tube 20 into the exit tube 24.

DETAILED DESCRIPTION OF THE PREFERRED EMBODIMENT

The present invention provides a toilet flush valve water accelerator which decreases the quantity of water required by a toilet, while maintaining the efficacy of the toilet, by increasing the velocity and action of the water as it enters the toilet bowl.

In the preferred embodiment, a toilet flush valve water accelerator is provided which ma be mounted into the existing flush valve. This device also uses the existing flap valve 10 as shown in the preferred embodiment. It is not necessary, however, that the existing flush valve 2 or flap valve 10 be used. The salient features of the device are demonstrated herein, and the entire device, or components, could be designed in a prototypical fashion, rather than adapted to the existing flush valve.

The device of the preferred embodiment is characterized by an entry tube 20 which accepts water which is exiting the water closet 18, and an exit tube 24. As shown in FIG. 4, the device of the preferred embodiment has three distinct sections, the entry tube 20, the connecting tube 22, and the exit tube 24. The device is mounted within the water closet so that the exit tube 24 tube extends through the floor 4 of the water closet to transport water into the toilet bowl, while the entry tube extends above the floor 4 of the water closet. The tube may be mounted as shown in FIGS. 1 and 4. The device may be attached, such as by epoxy glue, to the existing flush valve 2. The shoulder 26 created where the entry tube joins the connecting tube or exit tube rests on the flush valve at what was previously the opening to the flush valve. The flap valve is relocated upwardly from its normal position when used with the flush valve 2 alone, that is, the flap valve is moved along the outside diameter of the overflow tube so that it will contact the opening to the entry tube at the proper point.

As the lever 14 is actuated, the chain 12 pulls the flap valve 10 upwardly and away from the opening of the tube. FIG. 2. Water which has accumulated in the water closet now enters the entry tube, and travels from the entry tube 20 into the exit tube 24. FIG. 4.

The flap valve has a floatational characteristic, so that it does not immediately close as the lever is released. As the water level decreases, the flap valve falls to a level which is closer to the opening of the tube. The suction created by the water entering the tube cause the velocity of the flap valve to increase in a downward direction toward the opening, and to securely fall against the opening of the tube, preventing water from entering tube. The toilet now begins to refill by conventional refill means, which is not shown in the drawings.

Since the opening of the tube is higher than the opening of the conventional flush valve 2, less water flows from the water closet, reducing the water used by the toilet, as may be expected. The water level shown in FIG. 3 demonstrates a water savings, since the water level would have dropped to approximately the point of opening of the flush valve 2 if the flush valve 2 were used alone.

However, an additional, and unexpected, result is achieved by the use of the device which results in a water saving. As water flows from the entry tube into the exit tube, the velocity of the water is accelerated. As the velocity of the water is accelerated, it creates a suction through the entry tube. This suction causes the flap valve to be pulled down against the opening to the tube earlier and more rapidly than the flap valve would otherwise fall. The flap valve seals the opening to the tube before the water level in the water closet falls to a level equal to the height of the opening of the tube. The amount of water which is saved results not only from the increased height of the opening of the tube, but also from the fact that the flap valve closes more quickly due to the additional suction created by the restriction along the length of the tube, and closes before the level in the water closet reaches the opening in the water entry tube of the device.

While the present invention uses less water than toilets which are typical of the prior art, the efficacy of the present device in cleaning the toilet bowl is equal to or greater than prior art devices The use of the entry tube 20 which connects by means of connecting tube 22 with the exit tube causes the water velocity to accelerate, resulting in increased water pressure, as the water passes into and out of the exit tube and into the toilet bowl.

The restriction of the connecting tube 22 and the exit tube 24 causes an acceleration and an increased pressure in the flow of water as the water passes through the device. The restriction of the exit tube is defined by a minimum inside diameter of the exit tube which is in a range of 45 to 55 percent of the median inside diameter of the entry tube. If the inside diameter of the exit tube is larger than 55 percent of the median inside diameter of the entry tube, the acceleration of the water through the device will be insufficient. If the restriction of the exit tube is smaller than 45 percent of the median inside diameter of the entry tube, then cavitation is likely to occur. The connecting tube 22 will have a decreasing diameter from the point of connection to the entry tube 20 to the point of connection with the exit tube 24.

In the preferred embodiment, the overall height of the device, that is, the combined median length of the three tubes, should be at least twice the minimum inside diameter of the exit tube. The connecting tube should have a length which is in range of 20 to 70 percent of the length of the entry tube.

The flush valves found in the prior art typically have an angled opening 36 when compared with the floor of the water closet. This angled opening facilitates the opening and closing of the flap valve, which is pulled along an arc created by the pivot point of the flap valve 10. FIG. 2. In the preferred embodiment, an angled surface which is parallel to the opening is duplicated at the shoulder of the tube to facilitate mounting of the device on existing flush valves. An additional step on the exterior surface of the exit tube which is parallel to the plane of the exit tube opening allows mounting on other types of existing flush valves. Two or more steps on the exterior surface of the connecting tube and exit tube facilitate mounting of the device on various flush valves designs.

What is claimed is:

1. A toilet flush valve water accelerator for a water closet of a toilet which transports water from said water closet to a toilet bowl of said toilet, comprising:
    a. an entry tube which receives water from said water closet;
    b. an exit tube having a minimum inside diameter which is in a range of 45 to 55 percent of the median inside diameter of said entry tube, wherein said exit tube is inserted through a bottom of said water closet to dispense water into said toilet bowl;
    c. a connecting tube which connects said entry tube and said exit tube, having a constantly decreasing inside diameter from the point of connection to said entry tube to the point of connection to said exit tube; and
    d. a flap valve means Which is held against an opening of said entry tube by water pressure from water present in the water closet so as to prevent water from flowing into said entry tube, but which may be lifted away from said opening of said entry tube to allow water to enter said entry tube.

2. A toilet flush valve water accelerator for a water closet of a toilet as described in claim 1, wherein the overall median length of the entry tube, the connecting tube and the exit tube is at least twice the minimum inside diameter of the exit tube.

3. A toilet flush valve water accelerator for a water closet of a toilet as described in claim 1, wherein the length of the connecting tube is in a range of 20 to 70 percent of the length of said entry tube.

4. A toilet flush valve water accelerator for a water closet of a toilet as described in claim 2, wherein the length of the connecting tube is in a range of 20 to 70 percent of the length of said entry tube.

5. A toilet flush valve water accelerator for a water closet of a toilet as described in claim 1, wherein an exterior surface of said exit tube and said connecting tube has at least two steps formed therein.

6. A toilet flush valve water accelerator for a water closet of a toilet as described in claim 2, wherein an exterior surface of said exit tube and said connecting tube has at least two steps formed therein.

7. A toilet flush valve water accelerator for a water closet of a toilet as described in claim 3, wherein an exterior surface of said exit tube and said connecting tube has at least two steps formed therein.

8. A toilet flush valve water accelerator for a water closet of a toilet as described in claim 4, wherein an exterior surface of said exit tube and said connecting tube has at least two steps formed therein.

* * * * *